Jan. 19, 1926.

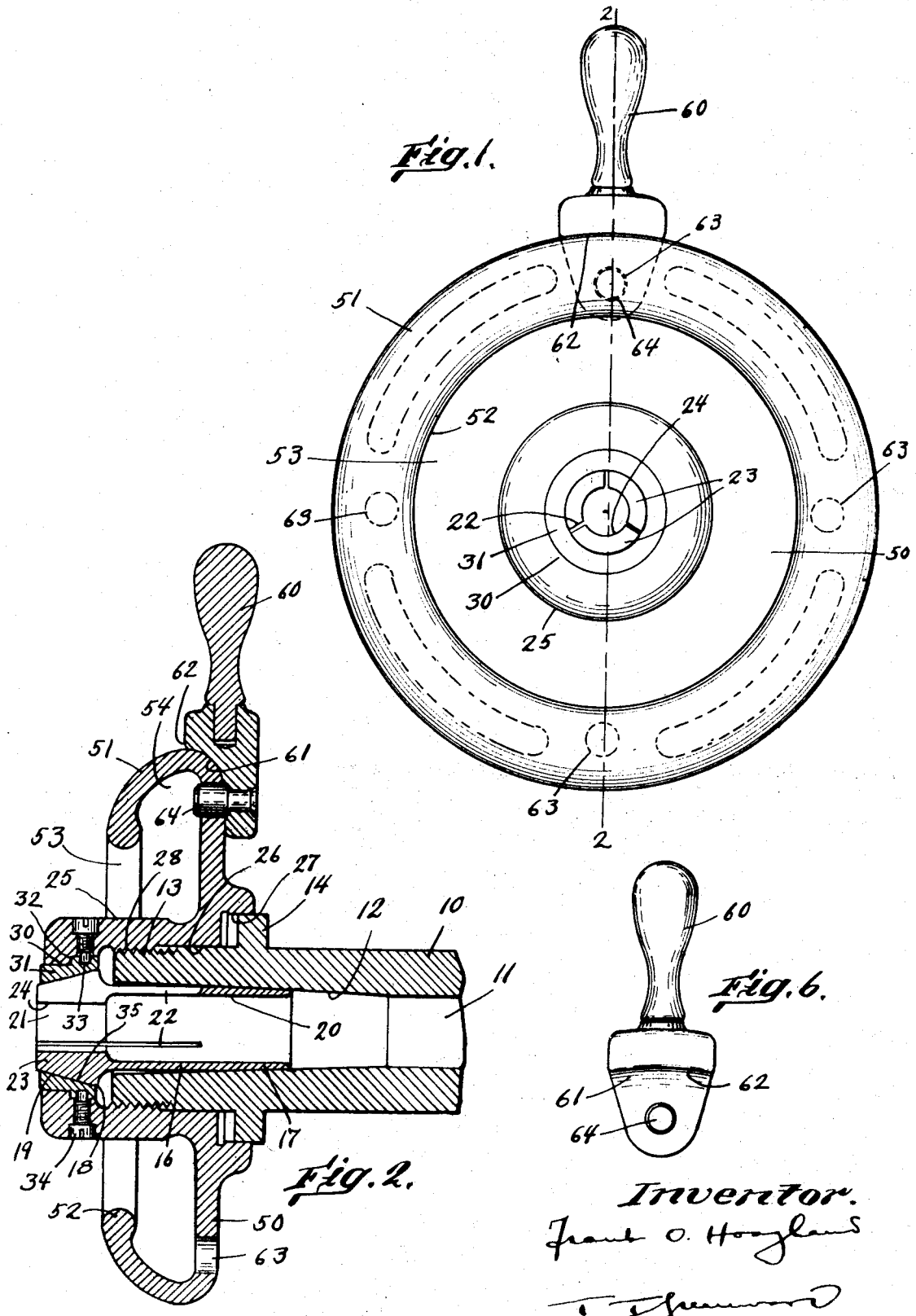

F. O. HOAGLAND

COLLET AND COLLET MECHANISM

Filed Jan. 20, 1923    2 Sheets-Sheet 2

1,570,251

Inventor.
Frank O Hoagland
by
[signature]
atty

Patented Jan. 19, 1926.

1,570,251

UNITED STATES PATENT OFFICE.

FRANK O. HOAGLAND, OF BRIDGEPORT, CONNECTICUT, ASSIGNOR TO REED-PRENTICE COMPANY, OF WORCESTER, MASSACHUSETTS, A CORPORATION OF MASSACHUSETTS.

COLLET AND COLLET MECHANISM.

Application filed January 20, 1923. Serial No. 613,999.

*To whom it may concern:*

Be it known that I, FRANK O. HOAGLAND, a citizen of the United States, residing in Bridgeport, in the county of Fairfield and State of Connecticut, have invented an Improvement in Collets and Collet Mechanisms, of which the following is a specification.

This invention relates to chucks and the like adapted to secure stock to be worked upon to a rotatable shaft or arbor, and has particular reference to collets and collet mechanisms of the type set forth in my copending application Serial No. 524,877, filed December 27, 1921.

An object of this invention is to provide a collet mechanism with means by which it may be conveniently and firmly engaged by the hand, whereby to set and release the collet, and, particularly, to provide the collet mechanism of my above-named application with such means.

A further object of this invention is generally to improve the construction and operation of collets and collet mechanisms.

Fig. 1 is an end view of a collet mechanism embodying the invention.

Fig. 2 is a sectional elevation along line 2—2 of Fig. 1.

Fig. 6 is a front elevation of a handle for setting and releasing the collet.

Figure 3:
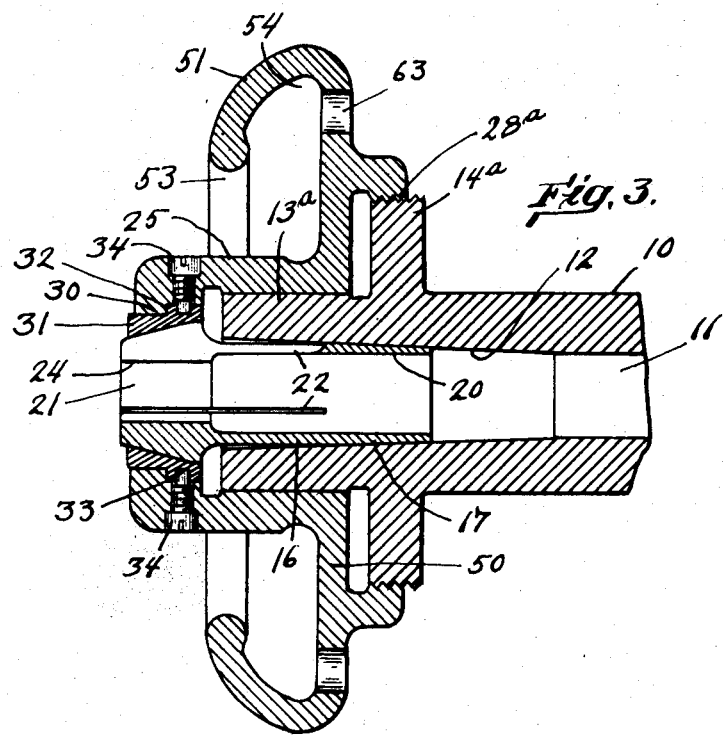
Fig. 3 is a view similar to Fig. 2 but illustrating a modified method of threading the actuating member of the collet mechanism to an arbor.
Figure 4:
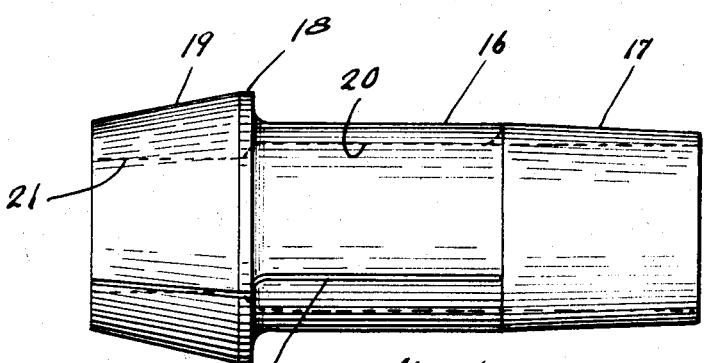
Fig. 4 is a side view of the collet.
Figure 5:
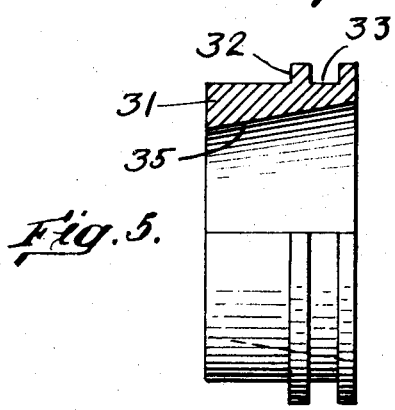
Fig. 5 is a side elevation, partly in section, of the collet compression ring.

As here shown, my invention is applied to the shaft or arbor 10 which may have the axial bore 11 formed with the expanding taper 12 which is adapted to receive a lathe center and also the collet. Said arbor may have the externally screw-threaded end-portion 13 and the plain flange 14, as in Fig. 2, or the end-portion 13ᵃ may be smooth and cylindrical and the flange 14ᵃ may be externally screw-threaded, as in Fig. 3.

The collet may have the substantially cylindrical body-portion 16 formed with the tapered rear end-portion 17, the taper of which is adapted to correspond to the taper 12 of the arbor 10. The front end of said collet is formed with the enlarged head-portion 18 which has the external taper 19. The collet is provided with the internal bore 20 and the enlarged head-portion is formed with the axial bore 21. The collet also is formed with a plurality of longitudinal slots 22 which extend through the wall thereof from the enlarged head-portion to a point adjacent the rear tapered portion thereof, whereby to provide a plurality of resilient sections 23 having internal stock-gripping faces 24.

The collet mechanism includes an actuating member having a hub 25 formed with the internal bore 26 in which the end of the arbor 10 is adapted to be received; and an enlarged bore 27 adapted to receive the flange 14 of the arbor. Said bore 26 may be internally screw-threaded as at 28, Fig. 2, whereby to fit the screw-threads on the end of the arbor, and the enlarged bore 27 may be of such dimensions as to snugly receive the flange of the arbor, whereby the actuating member may be supported axially by said flange; or said bore 26 may be plain and adapted snugly to fit the cylindrical end-portion 13ᵃ of the arbor and the enlarged bore 27 may have the internal screw-threads 28ᵃ adapted to receive the screw-threads 14ᵃ of the flange, Fig. 3. In either case, the arrangement is or may be such that said actuating member has screw-threaded connection with the arbor and is supported axially thereon.

The forward end of said hub 25 of the actuating member is formed with the inwardly-directed annular flange 30 against which a compression ring 31 is adapted to bear.

Said compression ring 31 is received rotatably within said hub and may be formed with the outstanding annular flange 32 adapted to bear against the flange 30 of said hub. Said flange 32 may have the peripheral groove 33 therein and screws 34 may be received in and extended through said hub and be loosely received in said groove 33 whereby to secure said ring against axial movement in said hub and yet permit it to rotate freely therein. Said ring 31 is formed with the internal taper 35 which corresponds with the external taper 19 of the head of the collet. Said ring is adapted to be forced against said collet by the screwing of the actuating member on the arbor, whereby to force inwardly the resilient sections 23 of the collet and cause said sections to engage the stock placed in the collet and also force the collet firmly into driving engagement with said arbor.

The construction so far described is set forth in my above-named co-pending application.

This invention is particularly concerned with means by which the actuating member of the collet mechanism may be engaged manually to be operated to set and release the collet.

The hub 25 of the actuating member is formed or provided with an annular flange 50 which extends outwardly from the hub for a suitable distance and is then formed with the forwardly and downwardly directed rim 51 which terminates in the annular edge 52, which latter is below the outer edge of the flange and is substantially concentric with the axis of the hub 25 and is clear of said hub to provide an annular space 53 in which the hand may be inserted. The parts 50, 51 and 52 are preferably made of aluminum or other strong, light material. The arrangement of the flange also provides a space 54 between the forward portion 51 and the rear portion in which the fingers of the hand are adapted to be received. This results in providing a bowl-shaped plate of aluminum or other suitable material permanently attached to and concentric with the hub which gives a powerful leverage for turning the hub and has many advantages readily apparent This arrangement, also, is such that the hand may securely grip the rim 51 of the actuating member and actuate it to set and release the collet, and the grip of the hand is aided by the annular edge 52 of said rim, the curve of which serves to increase the security of the grip on the flange.

The outer face of the flange is or may be smooth and thereby offers no projection to catch adjacent objects.

The actuating member also is or may be provided with a detachable handle 60 by which said actuating member may be operated. Said handle is or may be provided with a body-portion having a recessed face 61 adapted to conform more or less to the rear face of the flange of the actuating member; and the top edge 62 of said recess is of substantial extent and is or may be formed to conform with the outer periphery of said flange 50. Said flange is formed with a plurality of holes 63 therein within the outer periphery thereof and said handle is formed or provided with a projection, as the pin 64, which is adapted removably to enter any of said holes; and said holes are so disposed that, when said pin 64 is received therein, the top edge 62 of said handle is substantially in contact with the outer periphery of the flange 50 of the actuating member. With this arrangement, the handle serves to clutch the flange in a manner readily comprehended, whereby to rotate it.

I claim:

1. Collet mechanism including a manually rotatable actuating member having a hub provided with an annular outstanding flange which has an inwardly-directed manually-engageable rim-portion having an unobstructed finger-space between it and the body of the flange and terminating in an annular edge which has an unobstructed finger-space between it and said hub.

2. Collet mechanism including a manually rotatable actuating member having a hub formed with an annular outstanding flange, said flange having an internal annular and relatively deep finger receiving recess therein and an unobstructed annular passage communicating with said recess between said hub and the edge of the recess.

3. Collet mechanism including a manually rotatable actuating member having a hub provided with a flange which has an annular, inwardly-directed and relatively deep rim arranged substantially concentric with and spaced radially from said hub and also spaced from said flange, said spaces arranged to receive the fingers of the hand when engaging said rim.

4. Collet mechanism including a manually rotatable actuating member having a collet-actuating hub and a manually-engageable annular flange connected with and outstanding from said hub, the outer portion of which flange is directed forwardly and downwardly to provide an annular rim which is spaced from the hub and also from the body of the flange to provide an annular and relatively deep finger-recess within the rim and the body of the flange.

5. Collet mechanism including the combination of a rotatable acutating member including a hub arranged for screw-threaded engagement with an arbor, and provided with collet-actuating means, said hub having an annular outstanding flange which has an opening within its outer periphery, and an actuating handle having a projection adapted removably to enter said opening in the flange and formed with a flange-gripping face shaped to conform to and engage the periphery of said flange, whereby to rotate said actuating member.

6. In combination with an arbor for rotating a collet, a hub having threaded engagement with said arbor, and also having collet-actuating means, and a spokeless wheel upon said hub giving leverage for turning said hub manually.

7. In combination with an arbor for rotating a collet, a hub having threaded engagement with said arbor, and also having collet-actuating means, and a spokeless wheel upon said hub giving leverage for turning said hub, said spokeless wheel consisting of a bowl-shaped metal plate surrounding said hub.

In testimony whereof, I have signed my name to this specification.

FRANK O. HOAGLAND.